United States Patent [19]

Yuhasz

[11] Patent Number: 5,005,211
[45] Date of Patent: Apr. 2, 1991

[54] WIRELESS POWER CONTROL SYSTEM WITH AUXILIARY LOCAL CONTROL

[75] Inventor: Stephen J. Yuhasz, Zionsville, Pa.

[73] Assignee: Lutron Electronics Co., Inc., Coopersburg, Pa.

[21] Appl. No.: 412,572

[22] Filed: Sep. 25, 1989

Related U.S. Application Data

[63] Continuation of Ser. No. 79,845, Jul. 30, 1987, abandoned.

[51] Int. Cl.⁵ .......................................... H04B 10/10
[52] U.S. Cl. .............................. 455/603; 315/295; 323/905
[58] Field of Search ............... 323/905; 315/208, 291, 315/297, 294–295; 455/603, 617, 606–608

[56] References Cited

U.S. PATENT DOCUMENTS

| | | | |
|---|---|---|---|
| 2,842,716 | 7/1958 | Du Broff | 315/295 |
| 3,746,923 | 7/1973 | Spira | 315/291 |
| 3,924,120 | 12/1975 | Cox, III | 455/603 |
| 4,267,606 | 5/1982 | Stelter | 455/608 |
| 4,313,227 | 1/1982 | Eder | 455/608 |
| 4,388,567 | 6/1983 | Yamazaki et al. | 315/294 |
| 4,471,353 | 9/1984 | Cernik | 455/613 |
| 4,499,452 | 2/1985 | Nicolas | 315/294 |
| 4,563,592 | 1/1986 | Yuhasz et al. | 323/905 |
| 4,575,660 | 3/1986 | Zaharchuk et al. | 315/295 |
| 4,633,514 | 12/1986 | Fimoff et al. | 455/603 |
| 4,689,547 | 8/1987 | Rowen et al. | 323/905 |

FOREIGN PATENT DOCUMENTS

2368096 6/1978 France ................. 455/603

Primary Examiner—Reinhard J. Eisenzopf
Assistant Examiner—L. Van Beek
Attorney, Agent, or Firm—Seidel, Gonda, Lavorgna & Monaco

[57] ABSTRACT

A multiple-input power control system accepts control signals from a radiant signal transmitter and from a local control, selects one of the signals, and provides the selected signal to a power controller to control the power to a load. At least one of the control signal sources has an actuator which is movable through a range of positions, to determine the control signal provided by that source. The system finds particular utility in controlling lighting loads.

6 Claims, 2 Drawing Sheets

WIRELESS POWER CONTROL SYSTEM WITH AUXILIARY LOCAL CONTROL

This application is a continuation of application U.S. Ser. No. 079,845 now abandoned, filed July 30 1987.

BACKGROUND OF THE INVENTION

This invention relates to an electrical control system, and more particularly to a novel Wireless electrical load control system Wherein control of the poWer supplied to a load may be varied from a remote location by using a remote control device not electrically wired to the load and from a local control deVice which is electrically wired to the load.

Although the invention is described with reference to the control of lighting level, it has application in other areas, such as the control of sound volume, tone or balance; video brightness or contrast; the tuning setting of a radio or television receiver and the position, velocity or acceleration of a moveable object.

Load control systems are known in which the power supplied to the load can be adjusted by control units mounted at one or more different locations remote from the power controller. The control units are typically connected to the controller using two or three electrical wires in the structure in which the load control system is used. In an advanced version of such systems, control is transferred between different locations immediately upon manipulation of a control switch without the need for any additional overt act by the user. See, for instance, copending U.S. Pat. application Ser. No. 857,739, filed Apr. 29, 1986 with U.S. Pat. No. 4,689,547, issued Aug. 25, 1987, to M. J. Rowen et al.

To permit greater user flexibility and to permit installation of a load control system with no modification of the existing wiring system in the structure, load control systems have been modified to incorporate wireless remote control units. For example, a known type of light dimming system uses a power controller/receiver/local control and a remote control transmitter for transmitting a control signal by radio, infrared, or microwave to the power controller/receiver/local control. In these systems, a switch on the transmitter or local control must typically be maintained in a depressed position until the desired light level is reached. In such a system, it is only possible to cause the light level to be raised or lowered at a predetermined fixed rate and it is not possible to select a particular light level directly, nor is there any visual indication at the transmitter of the light level selected. In such a system a lag of two to ten seconds typically exists between actuation of the transmitter or local control and achievement of the desired light level. Especially at the higher end of the range, this lag tends to limit the commercial acceptability of such systems.

Alternative load control systems have been produced that incorporate wireless remote controls where the desired light level is reached instantaneously on operation of the remote control unit. Unfortunately, these systems only allow the selection of three or four light levels that have been previously programmed at the power controller/receiver; usually it is not possible to select one of an essentially continuous range of values.

In the case of the systems using radio waves for the control signal transmission medium, the transmitter is often larger than is commercially desirable so as to accomodate the radio transmitting system, and an antenna must frequently be hung from the controller/receiver.

Remote control systems are frequently incorporated in television sets. In these systems, a switch on the transmitter must typically be maintained in a depressed position until the desired load level, e.g., volume, is reached, with a time lag typically existing between the depression of the switch and achievement of the desired load level. Model airplanes are typically controlled by remote radio control where a control signal is typically continually transmitted during the operation of the airplane. It is possible, however, to select the control signal from an essentially continuous range of values.

Generally, in the known wireless remote load control systems, both the local and wireless remote controls are of the raise/lower type described above, where a switch has to be maintained in a depressed position until the desired load level is reached. In such a system, it is not necessary for the power controller receiving signals from the local and wireless remote controls to be able to choose which control signal to respond to as a raise signal has the same effect whether it comes from the local or wireless remote controls.

However, in a wireless remote load control system wherein either the wireless remote control or local control or both adjust power to the load through a continuous range of values immediately as the control actuator of the control device is manipulated, it is necessary for the power controller to be able to choose which control signal to respond to, as the instantaneous signals from the local and remote controls will necessarily be different.

BRIEF DESCRIPTION OF THE INVENTION

A primary object of the present invention is to provide a means of choosing between the signals coming from the wireless remote control, or from the local control in a wireless remote load control system wherein either the wireless remote control or the local control or both adjust power to the load through a continuous range of values immediately as the control actuator of the control device is manipulated.

To achieve this and other objects, the invention generally comprises a novel wireless remote control dimmer system with a local control for controlling application of alternating current to a load. The system includes a power controller for varying the power supplied to the load pursuant to a control signal, a wireless remote control, a receiver, a local control and a 'decider' to choose between the local control signal and the wireless control signal received by the receiver, with at least one of the wireless remote control or the local control adjusting power to the load through a continuous range of values immediately as its control actuator is manipulated.

BRIEF DESCRIPTION OF THE FIGURES

For a fuller understanding of the nature and objects of the invention, reference should be had to the following detailed description taken in connection with the accompanying drawings wherein.

DETAILED DESCRIPTION OF THE FIGURES

Figure 1:
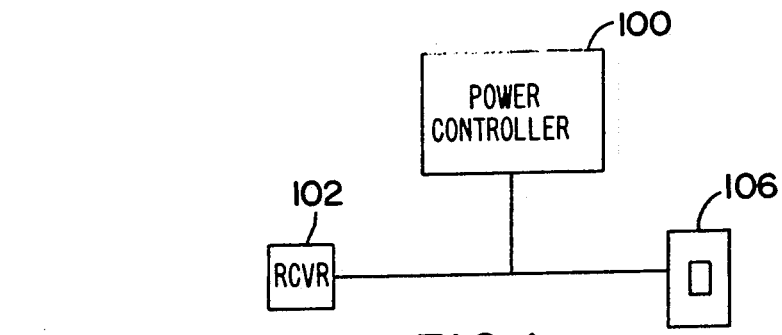
FIG. 1 is a block diagram showing an overview of a prior art remote control dimmer system wherein both the local and wireless remote controls are of the raise/lower type.

In the drawings, wherein like reference numberals denote like parts, a prior art remote control dimmer system is described in FIG. 1. The latter includes power controller 100 wireless transmitter 104, receiver 102 and local control 106. Wireless transmitter 104 is of the raise/lower type providing either separate signals for raising and lowering the light level or a single signal which causes the light level to be raised and lowered in a cyclical fashion until the signal is removed. The signals from transmitter 104 are received by receiver 102 and applied to power controller 100. Wired local control 106 is also of the raise/lower type, and once again, can provide either separate signals for raising and lowering the light level or a single signal which causes the light level to be raised and lowered in a cyclical fashion until the signal is removed. Once again, these signals are applied to power controller 100.

It should be noted that in this prior art case, it is not necessary for the power controller 100 to be able to distinguish whether a signal is coming from transmitter 104 or local control 106 because the effect of a raise or lower signal is the same regardless of its source.

Figure 2:
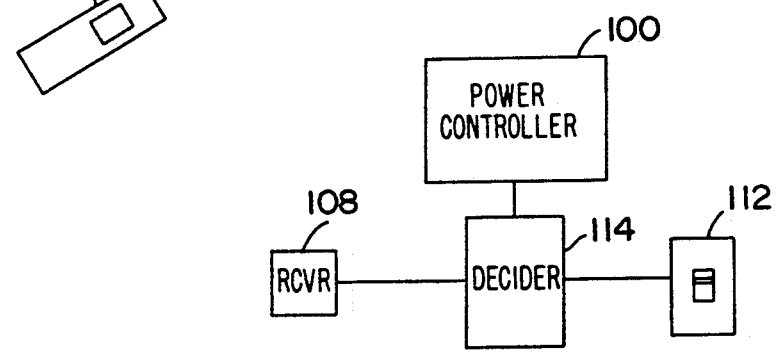
FIG. 2 is a block diagram showing an overview of one embodiment of the remote control dimmer system of the invention wherein both the local and wireless remote controls adjust power to the load through a continuous range of values immediately as their control actuators are manipulated.

An overview of one embodiment of the invention is described in FIG. 2. The latter includes power controller 100, wireless transmitter 110, receiver/memory unit 108, local control 112 and decider circuitry 114. Wireless transmitter 110 is of the type which causes power controller 100 to adjust power to a load through a continuous range of values immediately as its control actuator is manually moved through a range of positions. Signals from wireless transmitter 110 are received by receiver/memory unit 108, which stores in its memory unit the latest signal received from wireless transmitter 110. Local control 112 also causes power controller 100 to adjust power to the load through a continuous range of values immediately as its control actuator is manually moved.

The signals from local control 112 and receiver/memory unit 108 are applied to decider circuitry 114, which applies either the signal from local control 112 or the signal from receiver/memory unit 108 to power controller 100 in response to selection signals from local control 112 and receiver/memory unit 108. Suitable designs for transmitter 110, receiver/memory unit 108, power controller 100, local control 112 and decider circuitry 114 are discussed in copending U.S. Pat. application No. 079,847 filed July 30, 1987 incorporated herein by reference. As is described in detail in that application, power controller 100 preferably provides a phase-controlled output voltage.

Figure 3:
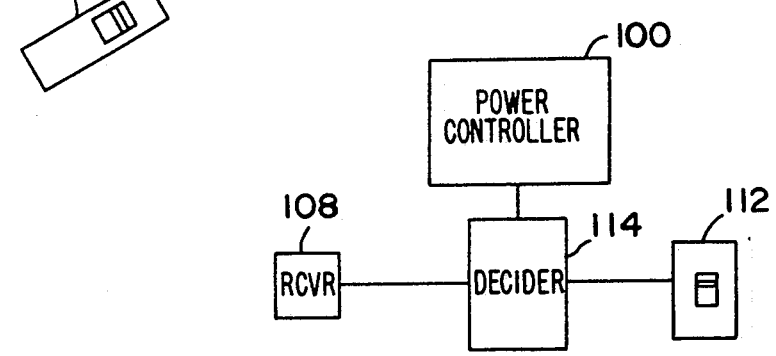
FIG. 3 is a block diagram showing an overview of an alternative embodiment of the remote control dimmer system of the invention wherein the wireless remote control is of the raise/lower type and the local control adjusts power to the load through a continuous range of values immediately as its control actuator is manipulated.

An alternative embodiment of the invention is illustrated in FIG. 3. Once again, power controller 100, local control 112 and decider circuitry 114 are included as in the embodiment illustrated in FIG. 2. However, in the alternative embodiment of FIG. 8 receiver/memory unit 108' receives signals from wireless transmitter 104, which is of the raise/lower type. These signals serve to modify the value of the output signal stored in the memory unit of receiver/memory unit 108 and hence cause the light level controlled by power controller 100 to increase or decrease accordingly. Once again, decider circuitry 114 responds to selection signals from receiver/memory unit 108 and local control 112 to apply either the signal from receiver/memory unit 108 or local control 112 to power controller 100.

Figure 4:
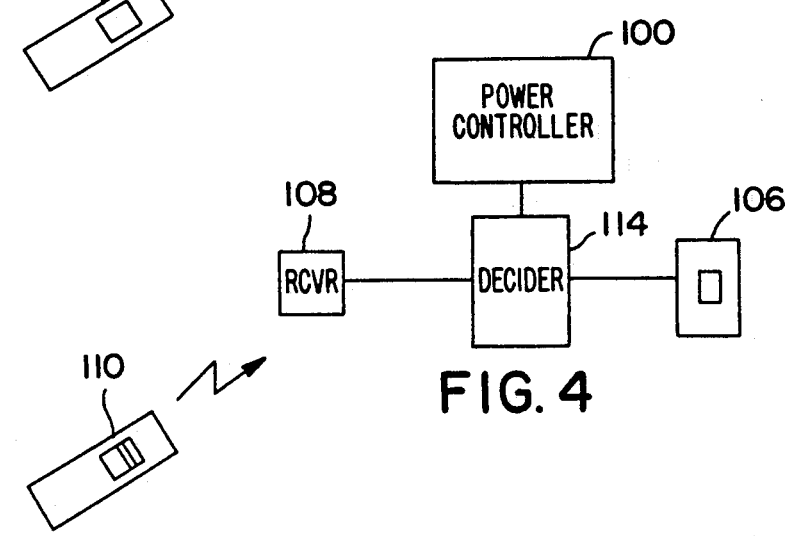
FIG. 4 is a block diagram showing an overview of another alternative embodiment of the remote control dimmer system of the invention wherein the local control is of the raise/lower type and the wireless remote control adjusts power to the load through a continuous range of values immediately as its control actuator is manipulated.

A further embodiment of the invention is illustrated in FIG. 4. As in the embodiment illustrated in FIG. 2, power controller 100, wireless transmitter 110, receiver/memory unit 108 and decider circuitry 114 are included. However, local control 112 is replaced by local control 106'. Local control 106' is of the raise/lower type and has an internal memory to store the value of the signal to be applied to power controller 100. Operating the local control 106' causes the signal value stored in the internal memory to be changed. Decider circuitry 114 responds to selection signals from receiver/memory unit 108 or local control 106' to apply either the signal from receiver/memory unit 108 or local control 106' to power controller 100.

The memory circuitry in receiver/memory unit 108 or 108' or in local control 106' can be either digital or analog.

Figure 5:
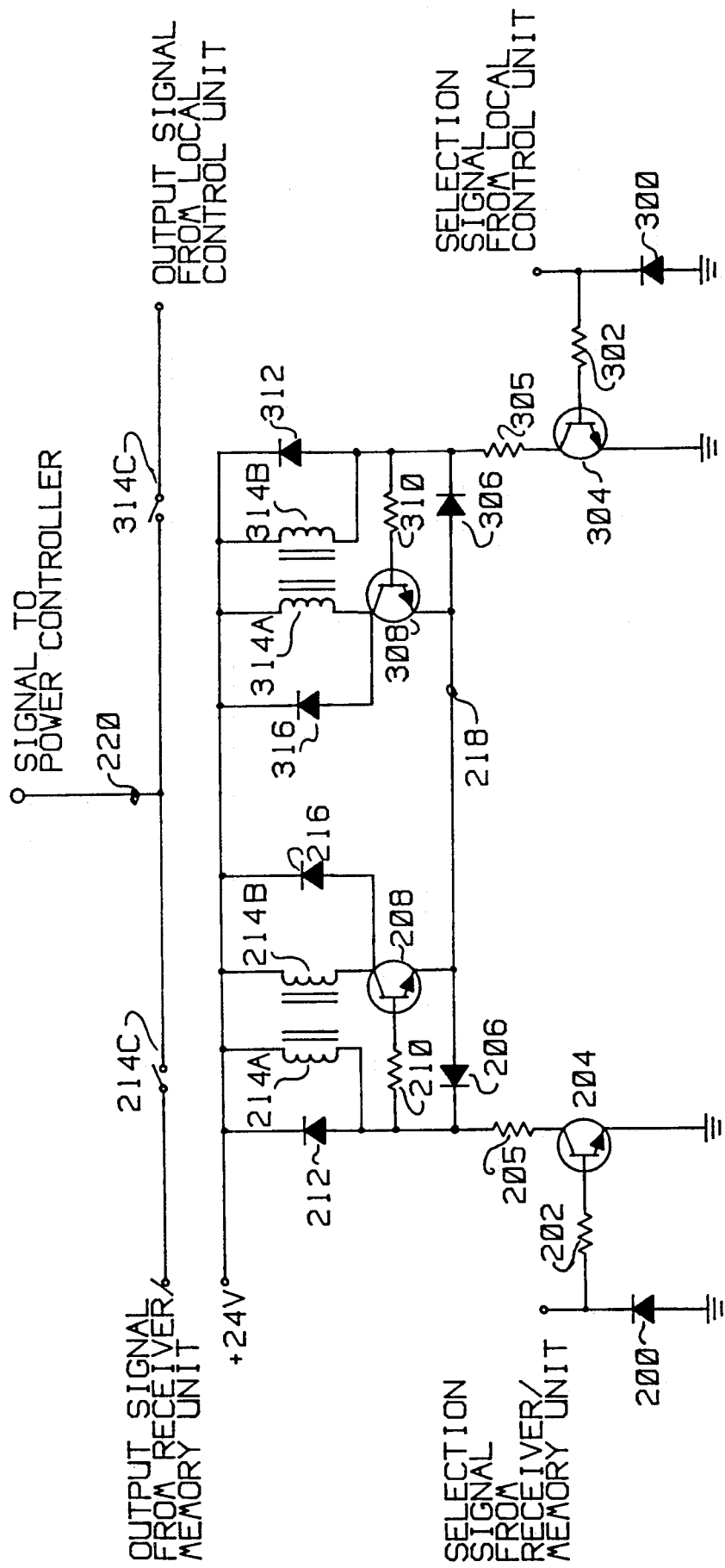
FIG. 5 is a schematic diagram of a decider circuit suitable for use with the invention.

Decider circuitry suitable for use with the invention is illustrated in FIG. 5. The selection signal line from the receiver memory unit is connected to the cathode of diode 200 and one terminal of resistor 202. The anode of diode 200 is connected to ground. The other terminal of resistor 202 is connected to the base of transistor 204. The emitter of transistor 204 is connected to ground and the collector is connected to one terminal of resistor 205. The other terminal of resistor 206 is connected to the cathode of diode 206, one terminal of resistor 210, one terminal of latching relay coil 214A and the anode of diode 212.

The other terminal of resistor 210 is connected to the base of transistor 208. The anode of diode 206 is connected to the emitter of transistor 208 and to command line 218. The collector of transistor 208 is connected to one terminal of latching relay coil 214B and to the anode of diode 216. The cathodes of diodes 212 and 216 and the other terminals of relay coils 214A and 214B are connected to the positive terminal of a 24 V DC supply.

The output signal from the receiver/memory unit is connected to one terminal of relay contacts 214C. The other terminal of relay contacts 214C being connected to the signal line to the power controller, 220.

The selection signal from the local control unit is connected to the cathode of diode 300 and one terminal of resistor 302. The anode of diode 300 is connected to ground. The other terminal of resistor 302 is connected to the base of transistor 304. The emitter of transistor 304 is connected to ground and the collector is connected to one terminal of resistor 305. The other terminal of resitor 305 is connected to the cathode of diode 306, one terminal of resistor 310, one terminal of latching relay coil 314A and the anode of diode 312.

The other terminal of resistor 310 is connected to the base of transistor 308. The anode of diode 306 is connected to the emitter of transistor 308 and to command line 218. The collector of transistor 308 is connected to one terminal of latching relay coil 314B and to the anode of diode 316. The cathodes of diodes 312 and 816 and the other terminals of relay coils 314A and 314B are connected to the positive terminal of the 24 V DC supply.

The output signal from the local control unit is connected to one terminal of relay contacts 3140. The other terminal of relay contacts 3140 being connected to the signal line to the power controller 220.

The operation of the decider circuitry of FIG. 5 is as follows. Assume that relay contacts 3140 are closed and hence the signal from the local control unit is being applied to the power controller via line 220. On receipt by the receiver of a valid transmission from the transmitter, the selection signal from the receiver/memory unit goes high. This allows base current for transistor 204 to flow through resistor 202 turning transistor 204 on. This allows current to flow through relay coil 214A closing relay contacts 2140 and applying the output signal from the receiver/memory unit (and hence the wireless transmitter) to the power controller via line 220. At the same time, the emitter of transistor 308 is pulled low through diode 206, and transistor 308 receives base current through relay coil 314A and resistor 310. The collector current for transistor 308 flows through relay coil 314B, which opens relay contacts 314C. Since the relay formed by relay coils 214A, 214B, and relay contacts 214C is a latching relay, relay contacts 214C remain closed even when the signal at the cathode of diode 200 goes low again.

If now the local control unit is activated, then the selection signal line connected to the cathode of diode 300 and one terminal of resistor 302 will go high, turning transistor 304 on. This allows current to flow through relay coil 314A, closing relay contacts 314C and applying the output signal from the local control unit to the power controller via line 220. At the same time the emitter of transistor 203 is pulled low through diode 306, and transistor 208 receives base current through relay coil 214A and resistor 210. The collector current for transistor 208 flows through relay coil 214B, which opens relay contacts 2140. Since the relay formed by relay coils 314A, 314B and relay contacts 314C is a latching relay, relay contacts 314C remain closed even when the signal at the cathode of diode 300 goes low again.

Diodes 212, 216, 312, and 316 are flyback protection diodes for relay coils 214A, 214B, 314A, and 314B respectively. Diodes 200 and 300 are protection diodes for transistors 204 and 304 respectively.

The presently preferred values of the components for the circuit of FIG. 5 are as follows. Resistors 202 and 302, are 56k ohms; Resistors 205 and 305 are 68 ohms; Resistors 210 and 310 are 56k ohms. All diodes are type 1N914. All transistors are type MPSA29. Relay coils 214A and 214B and relay contacts 214C together form a latching relay, for example an Omron G5AK23-7POC24. Similarly, relay coils 314A and 314B and relay contacts 314C together form a second latching relay.

It should be apparent to one skilled in the art, that the implementation described hereinbefore can be extended to encompass more than one receiver or auxiliary local control.

Since these and certain other changes may be made in the above apparatus and method without departing from the scope of the invention herein involved, it is intended that all matter contained in the above description or shown in the accompanying drawings shall be interpreted in an illustrative and not a limiting sense.

I claim:

1. A wireless power control system with auxiliary local control comprising, in combination,
    (a) transmitter means to transmit a radiant first control signal,
    (b) receiver means to receive and store said first control signal,
    (c) auxiliary local control means to provide a second control signal,
    (d) decider means to select one of said first or second control signals and to provide said selected signal to power control means to control the power supplied from a source to a load over a substantially continuous range of values, wherein said transmitter means has actuator means manually movable through a continuous range of positions to produce said first control signal.

2. The system of claim 1 in which said auxiliary local control means has an actuator manually movable through a range of positions to produce said second control signal.

3. The system of claim 1 in which said auxiliary local control means produces control signals which serve only to increase and decrease the power supplied to the load.

4. The system of claim 1 in which said power control means controls a lighting load.

5. The system of claim 1 in which said power control means produces a phase controlled output signal.

6. The system of claim 1 in which said decider means comprises at least one latching relay.

* * * * *